UNITED STATES PATENT OFFICE.

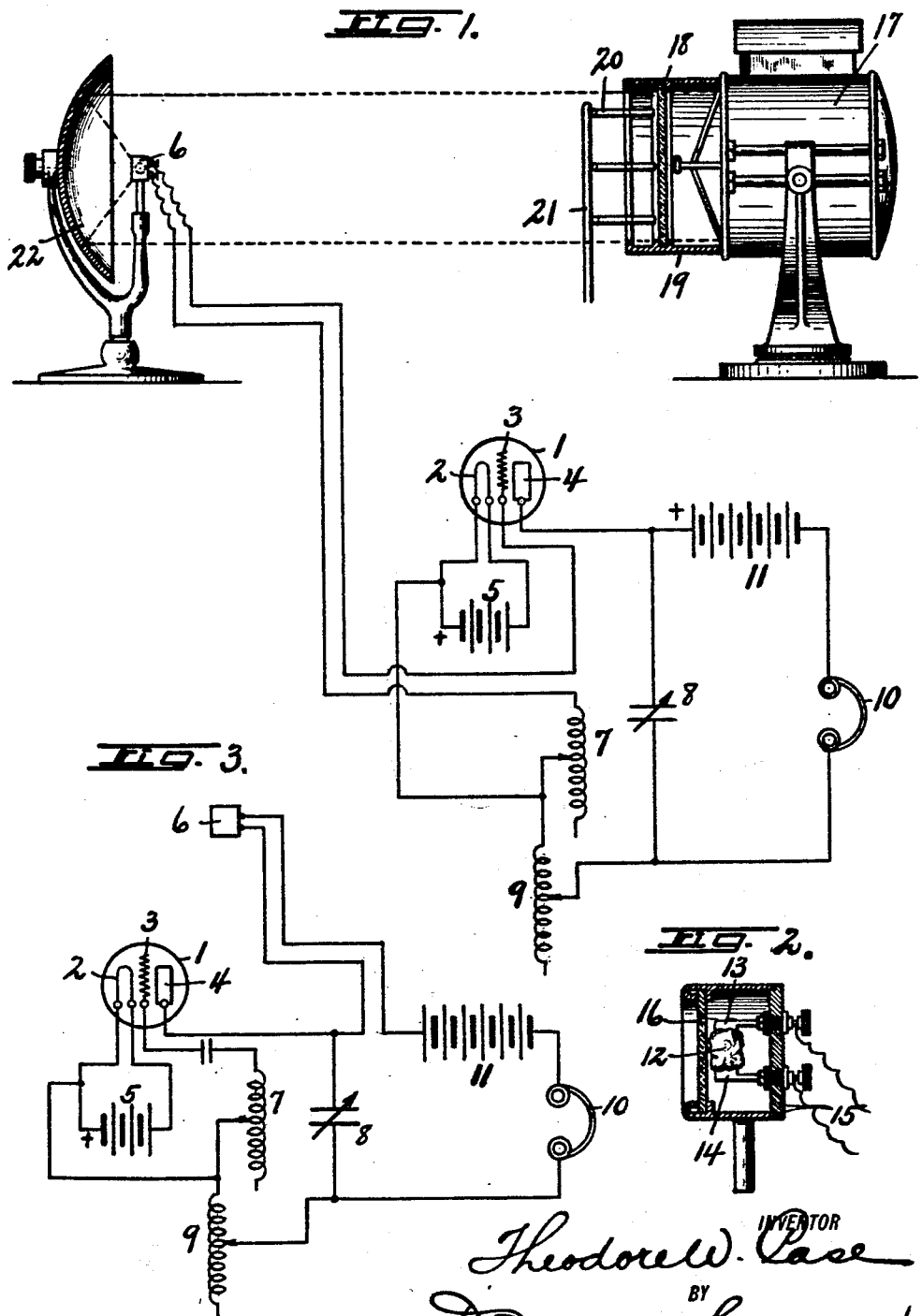

THEODORE W. CASE, OF SCIPIO, NEW YORK.

RADIANT-ENERGY DETECTING AND TRANSLATING DEVICE.

1,390,883.      Specification of Letters Patent.    Patented Sept. 13, 1921.

Application filed April 5, 1918. Serial No. 226,905.

*To all whom it may concern:*

Be it known that I, THEODORE W. CASE, a citizen of the United States of America, and resident of Scipio, in the county of Cayuga, in the State of New York, have invented new and useful Improvements in Radiant-Energy Detecting and Translating Devices, of which the following, taken in connection with the accompanying drawings, is a full, clear, and exact description.

This invention relates to certain new and useful radiant energy detecting and translating devices, and more particularly to an electrical device for detecting light rays and variations in the same, and translating the same into current variations measurable by known instruments or into signals of an audible or other character.

The primary object of the invention is to provide an exceedingly sensitive apparatus embodying a normally oscillating circuit and an "audion" or multiple element valve detector for detecting and translating or indicating very slight changes in resistance in a predetermined circuit resulting from variations of intensity of light rays to which the resistance is exposed.

Various uses and objects of the invention will be readily apparent and the details of the construction of apparatus will fully appear from the following description taken in connection with the accompanying drawings,—in which—

Figure —1— diagrammatically illustrates an embodiment of my invention in which changes in intensity of light to which the resistance is exposed vary the frequency of oscillation in the circuit.

Fig. —2— is a sectional view of light-responsive device adapted for incorporation in the apparatus of Fig. —1—.

Fig. —3— is a modified form of device in which changes in intensity of light to which the resistance is exposed varies the amplitude rather than the pitch of the note heard in the receivers.

The apparatus, as shown, comprises an amplifying device as the well known "audion" consisting of a vacuum vessel —1—
containing three electrodes, one of which is adapted to be heated. These electrodes may take the form of a filament —2—, a grid —3— and a plate —4—. The filament may be heated in any suitable way, and for this purpose is shown as provided with a battery —5— connected across the terminals of the filament.

The light reactive cell —6— may as shown in Fig. —1— be connected in series with an adjustable inductance —7— across the grid and filament. An adjustable condenser —8— may be connected in series with an adjustable inductance —9— across the plate and filament with an indicating device as telephone receiver —10— and a potential as battery —11— in shunt with the condenser. The apparatus with connections as described produces a normally oscillating circuit and includes an "audion" or other multiple element valve detector. The incorporation of a light reactive cell in such an apparatus, whereby variations of resistance of the cell operate to vary either the frequency or the amplitude of the oscillations in such a manner that an appropriate indicating device can respond to such variations, constitutes my invention in its broader sense.

By the incorporation of the light reactive resistance in the circuit across the grid and filament in the manner shown in Fig. —1—, variations in light rays impinging on the resistance effect variations in frequency of the oscillations in the circuit including the indicating device thereby varying the pitch of the note heard in the receivers, if telephone receivers be used as the indicating means, it being understood that the circuit may be normally tuned to produce an audible note or a note of a frequency bordering on audibility.

The apparatus as shown in Fig. —3— is substantially the same as that shown in Fig. —1— except that the light reactive cell is arranged in series with the indicating device —10— and battery —11— and in shunt with the condenser —8—.

The light reactive cell when incorporated in the position shown in Fig. —3— effects a variation in the amplitude of the oscillations in the circuit including the indicating device producing a note of increased loudness in the telephone receivers if the same are used.

The inductances —7— and —9— should be so arranged that their relative position or distance from each other may be varied.

In the Fig. —2— I have illustrated one particular construction of light reactive cell comprising as shown a light reactive substance or crystal —12— supported by a pair of posts secured to but insulated from the casing —15—. A water tight cover plate —16— may be provided for casing —15— to permit the free passage of light rays to the light reactive substance or crystal.

As shown in Fig. —1— the sending means comprising a source of illumination preferable including a screen for transmitting only invisible rays and means for interrupting and establishing the illumination at will. The source of illumination may be an ordinarily incandescent bulb or any other source of light or may assume the form of an universaly mounted high intensity search light —17— capable of casting a beam of substantially parallel rays, dependent upon conditions and the distance signals should be sent. If it is desired to transmit only the infra red rays, a screen —8— of smoked glass of sufficient thickness to transmit only such rays or other substance opaque to short wave length light rays may be employed. The screen —18— may be conveniently located transversely of a drum-shaped extension —19— on the front of the search light.

While the beam may be controlled by making and breaking the search light circuit, if an electric search light is employed, I prefer to use a shutter because of its simplicity and reliability. Thus a shutter —20— of opaque material may be mounted at the front end of the extension —19— and may be opened and closed by means of a rod —21— adapted to be operated either manually or otherwise.

The effectiveness of the light responsive device at the receiving end may be enhanced by a reflector —22—. The light reactive substance is positioned at substantially the focus of the reflector.

The vacuum vessel —1— with its three electrodes, connected in circuits as described is an uni-directional device permitting the passage of current in one direction only, and is not utilized as a pulsation generator, as described in my Patent No. 1,379,166, but rather has a principle of operation distinctly different therefrom and in direct accordance with the known "audion" operation. The oscillating circuit may be created by any of the known methods desired such as for instance the use of appropriate capacities and inductances to produce a note of desired frequency in the receivers. Under such conditions variations in light rays to which the light reactive cell is subjected will change the character of the note heard in the receivers. As stated either frequency or amplitude may be varied in accordance with predetermined conditions.

It will be understood that the apparatus here disclosed may be utilized as a receiving apparatus for radiant energy or light rays, or may be used in connection with the system which enables the blind to read by sound, or for other purposes now known or hereafter to appear, and variations may obviously be made in the details of construction and arrangement of the apparatus and parts thereof as the oscillating circuit disclosed is purely illustrative, all without departing from the invention as set forth in the claims hereto appended.

What I claim is:

1. An apparatus for signaling by means of light rays comprising a source of light rays, means for interrupting the passage of rays from said source, means for receiving said rays and for giving an audible signal in response thereto comprising a vacuum vessel, containing a filament, a grid and a plate, means for heating the filament, a circuit connecting the filament and grid, and including a light-reactive resistance and an inductance, and a circuit connecting the filament and plate, said circuit containing a source of potential, a translating device and an inductance.

2. An apparatus for signaling by means of light rays comprising a source of light rays, means for interrupting the passage of light rays from said source, means for receiving said light rays and for giving an audible signal in response thereto comprising a vacuum vessel containing a filament, a grid and a plate, means for heating the filament, a circuit connecting the filament and grid and including a light-reactive resistance and an inductance, a circuit connecting the filament and plate, said circuit containing a source of potential, a translating device and an inductance, a condenser connected in series with the filament and plate in shunt with the said translating device.

In witness whereof I have hereunto set my hand this 29th day of March, 1918.

THEODORE W. CASE.

Witnesses:
G. JOHNSON,
B. S. CUSHMAN,